United States Patent [19]

Kocher

[11] 4,168,636
[45] Sep. 25, 1979

[54] REFRIGERATION COMPRESSOR HAVING MULTI-PART CRANKSHAFT

[75] Inventor: Erich J. Kocher, Milwaukee, Wis.

[73] Assignee: Vilter Manufacturing Corporation, Milwaukee, Wis.

[21] Appl. No.: 831,772

[22] Filed: Sep. 9, 1977

[51] Int. Cl.² .................. F16C 3/04; F16C 13/00; B25G 3/20; F16B 7/04
[52] U.S. Cl. .................................. 74/597; 85/84; 308/74; 308/15; 308/237 A; 403/368; 403/374
[58] Field of Search .............. 74/597, 595, 596; 62/498; 308/74, 15, 237 A, 71; 403/358, 368, 371, 374; 85/84

[56] References Cited

U.S. PATENT DOCUMENTS

| | | | |
|---|---|---|---|
| 1,363,466 | 12/1920 | Glor | 74/597 |
| 1,399,806 | 12/1921 | Scofield | 74/597 |
| 1,401,784 | 12/1921 | Jouffret | 74/586 X |
| 1,406,247 | 2/1922 | Tubbs | 74/597 X |
| 1,613,835 | 1/1927 | Kasper | 74/597 |
| 1,876,765 | 9/1932 | Scharff | 308/71 |
| 2,288,651 | 7/1942 | Ruist et al. | 74/597 |
| 2,377,035 | 5/1945 | Pixley | 403/371 X |
| 2,471,982 | 5/1949 | Shulda | 74/597 |
| 2,696,649 | 12/1954 | Clapper | 403/374 X |
| 2,730,912 | 1/1956 | Marinelli | 74/597 |
| 2,991,632 | 7/1961 | Rogers | 62/498 |
| 3,009,747 | 11/1961 | Pitzer | 308/71 |
| 3,388,616 | 6/1968 | Kume | 74/597 |
| 3,912,412 | 10/1975 | Struttmann | 403/368 |
| 4,025,213 | 5/1977 | Schafer et al. | 403/374 X |

FOREIGN PATENT DOCUMENTS

| | | | |
|---|---|---|---|
| 228172 | 8/1959 | Australia | 85/84 |
| 492406 | 7/1919 | France | 74/597 |
| 722345 | 3/1932 | France | 74/597 |
| 909830 | 5/1946 | France | 74/597 |
| 355060 | 8/1931 | United Kingdom | 74/597 |

Primary Examiner—Samuel Scott
Assistant Examiner—Don E. Ferrell
Attorney, Agent, or Firm—James E. Nilles

[57] ABSTRACT

A refrigeration compressor having a plurality of pistons reciprocated by a crankshaft and in which the crankshaft is made up of two parts that are permanently fixed together by means of a sleeve which is press fit over adjacent ends of the two pieces of the crankshaft. The adjacent ends also have complementary parts which inter-engage with one another so as to hold the throws of the crankshaft parts in proper relationship and timing to one another. A bearing is mounted on the press fit sleeve and a split bearing support then embraces the bearing so as to hold the assembly in precise support in the compressor frame. The split bearing support includes a lower bearing support case to which is bolted an upper semi-circular cap. The support case is also semi-circular and has a radial split cut into it which is bridged by a tapered pin so that upon tightening of the pin the bearing support case is urged apart or expanded to thereby be tightly mounted in the compressor frame.

8 Claims, 4 Drawing Figures

REFRIGERATION COMPRESSOR HAVING MULTI-PART CRANKSHAFT

BACKGROUND OF THE INVENTION

Multi-part crankshafts have been proposed and various means have been utilized to fasten the parts of the crankshaft together. Some prior art arrangements utilize bolts to hold them together and to permit dismantling of the crankshaft parts to service the bearings. Examples of such prior art crankshafts are shown in the U.S. Pat. No. 2,340,458 issued Feb. 4, 1944; No. 2,471,982 issued May 31, 1949; No. 3,851,361 issued Dec. 3, 1974; or No. 2,730,912 issued Jan. 17, 1956.

Another example of the prior art is shown in the U.S. Pat. No. 3,795,032 issued Mar. 5, 1974 which utilizes locating pins and bolts to hold the crankshaft portions together. Another example of a crankshaft utilizing bolts is shown in U.S. Pat. No. 1,613,835 issued Jan. 11, 1927. Still another example of the prior art is shown in U.S. Pat. No. 3,686,971 issued Aug. 29, 1972 which utilizes a spigot flange welded together, and which also serves as a pilot between the two crankshafts for holding the crankshafts together.

SUMMARY OF THE INVENTION

The present invention provides a refrigeration compressor having a compressor frame including an intermediate supporting frame wall, the compressor having a multi-part crankshaft in which the adjacent ends of the crankshaft are connected together by means of a tang and slot connection which holds the throws of the crankshaft parts in proper relationship to one another; a sleeve is press fit over the tang and slot connection and onto the adjacent ends of the crankshaft parts so that driving torque is transmitting through the press fit sleeve. A bearing surrounds the sleeve and the assembly is then rotatably journalled in a split bearing support which in turn has means for expanding a portion of the support to rigidly mount the support and the shaft assembly carried thereby in the intermediate frame wall of the compressor frame.

The two piece crankshaft provided by the present invention permits a more flexible manufacture and part stocking for compressor crankshafts, it being unnecessary to manufacture and consequently stock a long crankshaft. This in turn eliminates the problems involved in manufacturing long crankshafts, particularly in respect to machining the crankshaft and preventing warping and distortion thereof.

These and other objects and advantages of the present invention will appear hereinafter as this disclosure progresses, reference being made to the accompanying drawings.

DESCRIPTION OF A PREFERRED EMBODIMENT

Figure 1:
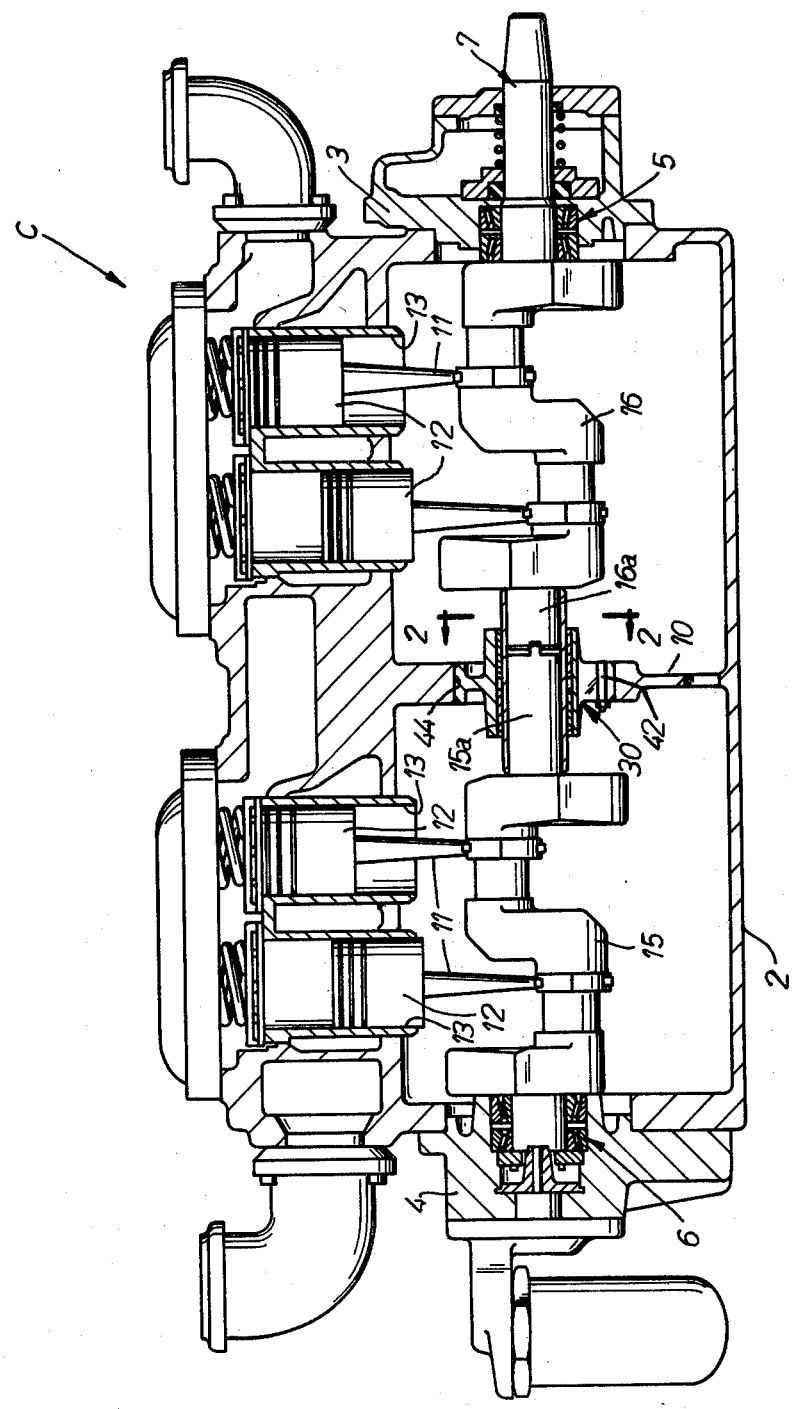
FIG. 1 is a longitudinal, cross sectional view through a compressor embodying the present invention.

A refrigeration compressor C is shown in FIG. 1 and includes a compressor frame 2 that in turn has end walls 3 and 4 for supporting conventional anti-friction bearing assemblies 5 and 6, respectively. The ends of the assembled crankshaft 7 are journalled in these bearing assemblies 5 and 6 in conventional manner. The compressor frame also includes a central frame wall 10 in which the assembled crankshaft 7 is rotatably journalled as will appear hereinafter. The compressor frame also includes the conventional rods 11, pistons 12 reciprocating in the cylinders 13 and additional comment concerning the compressor itself is not believed to be necessary or desirable except to say that these compressors are made with different numbers of pistons and consequently different throws on the crankshaft. For example, a compressor with as many as sixteen cylinders are not uncommon and at the same time, the manufacturer must be prepared to market compressors having crankshafts for four or eight cylinders, for example. It is not only difficult to manufacture the long crankshafts, but it is also difficult and costly to stock such a variety of shafts.

The crankshaft 7 as shown in the figures is comprised of the crankshaft part 15 and a complementary crankshaft part 16. The adjacent ends 15a and 16a of parts 15 and 16 have complementary inter-engaging members, for example, a tang 15c and a slot 16c formed on their adjacent ends and which mate together so as to insure that the throws of the crankshaft parts are properly positioned circumferentially in respect to one another. The crankshaft assembly provided by the present invention also includes a steel sleeve 20 which is press fit over the adjacent ends of the crankshaft parts so as to form a driving connection therebetween and transmitting torque between the parts. This press fit sleeve connection is a permanent one. Semi-cylindrical sleeve bearings 22, 24 are mounted around the sleeve 20, the latter also having a circumferentially arranged row of holes 26 through which lubricant can pass from rifle drilling 27.

Figure 2:
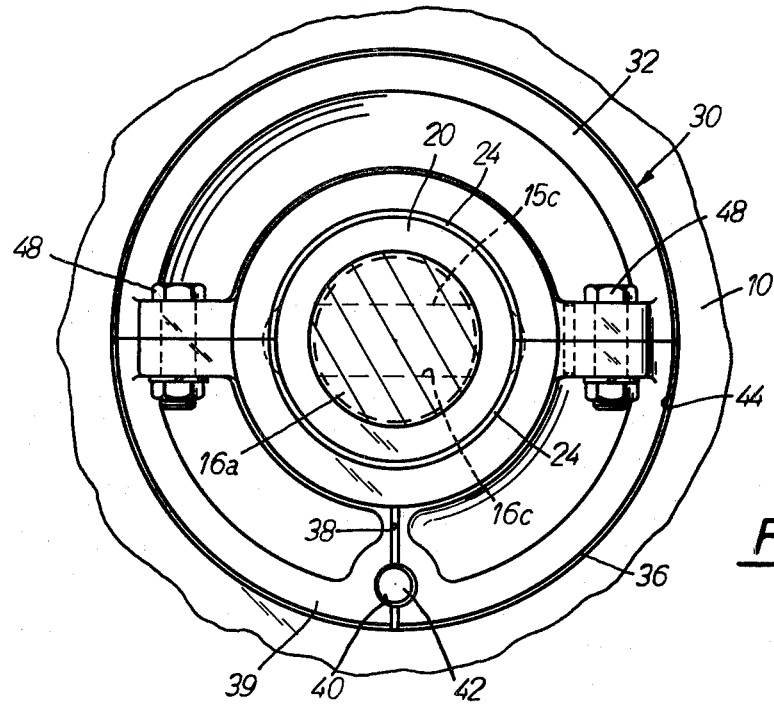
FIG. 2 is a sectional view taken along line 2—2 in FIG. 1, but on an enlarged scale.
Figure 3:
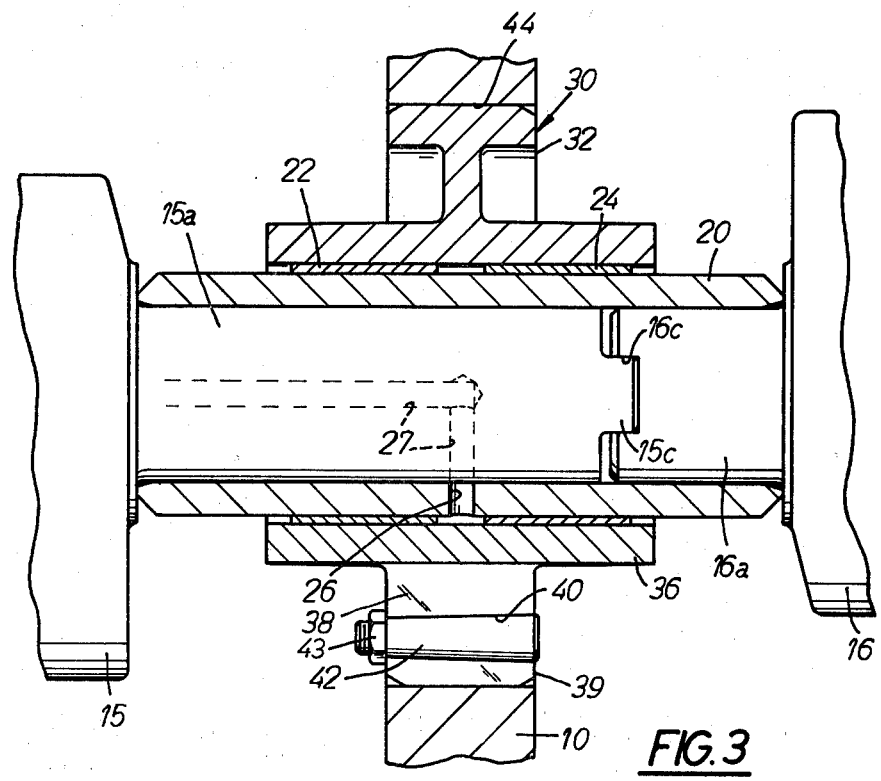
FIG. 3 is a detailed, fragmentary view of the central portion of the crankshaft assembly shown in FIG. 1.
Figure 4:
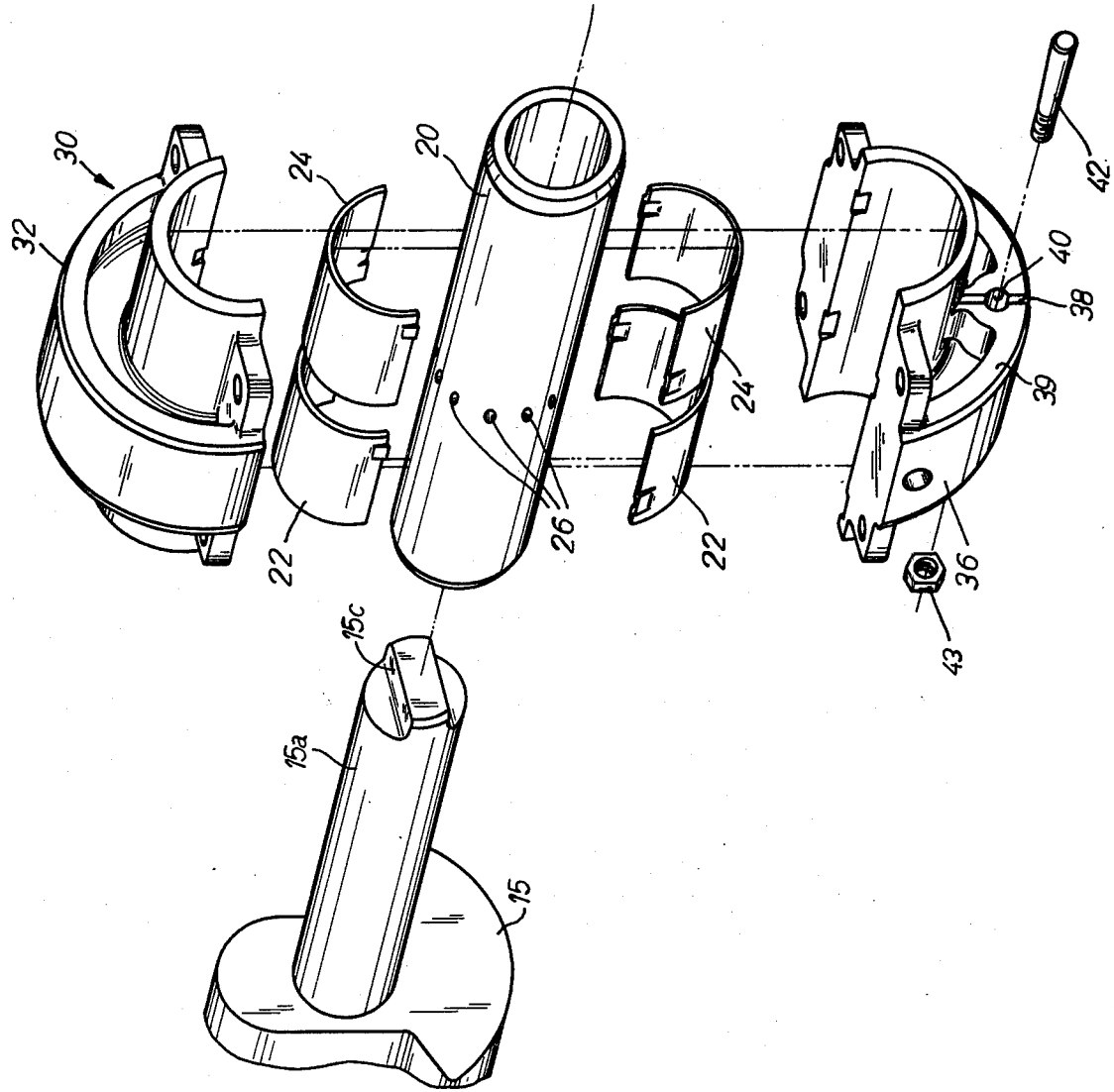
FIG. 4 is an exploded, perspective view of the assembly shown in FIG. 3.

A split bearing support 30 includes an upper, generally semi-cylindrical cap 32 and a lower generally cylindrical bearing support case 36. The latter has a radial and longitudinally extending slit 38 sawed into its flange portion 39 and a threaded, tapered hole 40 extends axially through the flange 39 and intersecting the slit 38. A tapered pin 42 is threadably engaged in the correspondingly tapered hole 40 so that upon tightening the nut 43, the bearing support case expands circumferentially, thereby being tightly engaged in the aperture 44 of the central frame wall 10. The upper cap 32 and lower bearing support case 36 are rigidly held together by the four bolt means 48 (FIG. 2) which extend through aligned holes in the cap and case.

The sleeve which is press fit onto adjacent ends of the shaft parts transmits torque and forms a driving connection between the parts and it also functions to carry the load on the shaft and transmits it to the compressor frame.

I claim:

1. A refrigeration compressor comprising a compressor frame having end walls and a center frame wall intermediate said end walls, a multi-part crankshaft rotatably journalled in said walls, said crankshaft comprising, an axially extending first crankshaft part and an axially extending second crankshaft part arranged in axial alignment and having adjacent ends, said axially extending crankshaft parts being rotatable on an axis, inter-engaging means integrally formed on said ends of said parts for positioning said crankshaft parts in a definite circumferential relationship, a sleeve press fit over said adjacent ends of said axially extending crankshaft parts for forming a torque transmitting driving connection between said parts, said sleeve being rotatable with said crankshaft parts on said axis, bearing means around said sleeve, and a split housing bearing support around said bearing means for supporting said bearing means and for rotatably supporting said crankshaft, said bearing support including an upper semi-cylindrical cap and a lower semi-cylindrical bearing support case removably secured to said cap, said center frame wall having an aperture in which said split housing bearing support is mounted, and fastening means for rigidly mounting said split housing bearing support in said center frame wall aperture.

2. The compressor set forth in claim 1 further characterized in that said inter-engaging means between said crankshaft parts comprises a tang formed on one of said parts and a complementary slot for receiving said tang on the other of said parts.

3. The compressor set forth in claim 1 further characterized in that said fastening means for said bearing support case comprises a radial slit formed in said bearing support case, a tapered hole in said case and located in said slit, and a tapered pin engageable in said hole for causing said support case to circumferentially expand in said center frame wall aperture for binding engagement therewith.

4. A refrigeration compressor comprising a compressor frame having end walls and a center frame wall intermediate said end walls, a multi-part crankshaft rotatably journalled in said walls, said crankshaft comprising, an axially extending first crankshaft part and an axially extending second crankshaft part arranged in axial alignment and having adjacent ends, said axially extending crankshaft parts being rotatable on an axis, inter-engaging means integrally formed on said ends of said parts for positioning said crankshaft parts in a definite circumferential relationship, said inter-engaging means comprising a transverse and axially extending tang formed on one of said parts and a complementary transverse slot on the other of said parts and for receiving said tang, a sleeve press fit over said adjacent ends of said axially extending crankshaft parts for forming a permanent torque transmitting driving connection between said parts, said sleeve being rotatable with said crankshaft parts on said axis, semi-cylindrical bearing means around said sleeve, and an axially split housing bearing support around said bearing means for supporting said bearing means and for rotatably supporting said crankshaft, said bearing support including an upper semi-cylindrical cap and a lower semi-cylindrical bearing support case removably secured to said cap, removable bolt means for securing said cap and case together, said center frame wall having an aperture in which said split housing bearing support is removably mounted, and fastening means for rigidly mounting said split housing bearing support in said center frame wall aperture; said fastening means comprising a radially and coaxially extending slit formed in said bearing support case, an axially extending tapered hole in said case and located in said slit, and a tapered pin engageable in said hole for causing said support case to circumferentially expand in said center frame wall aperture.

5. In combination: a multi-part crankshaft comprising, an axially extending first crankshaft part and an axially extending second crankshaft part arranged in axial alignment and having adjacent ends, the axially extending crankshaft parts being rotatable on an axis, inter-engaging means integrally formed on said ends of said parts for positioning said crankshaft parts in a definite circumferential relationship, a sleeve press fit over said adjacent ends of said axially extending crankshaft parts for forming a torque transmitting driving connection between said parts, said sleeve being rotatable with said crankshaft parts on said axis, bearing means around said sleeve, and a split housing bearing support around said bearing means for supporting said bearing means and for rotatably supporting said crankshaft, said bearing support including an upper semicylindrical cap and a lower semi-cylindrical bearing support case removably secured to said cap, and fastening means for circumferentially expanding said bearing support case.

6. The combination set forth in claim 5 further characterized in that said inter-engaging means between said crankshaft parts comprises a tang formed on one of said parts and a complementary slot for receiving said tang on the other of said parts.

7. The combination set forth in claim 5 further characterized in that said fastening means for said bearing support case comprises a slit formed in said bearing support case, a tapered hole in said case and located in said slit, and a tapered pin engageable in said hole for causing said support case to expand circumferentially.

8. In combination: a multi-part crankshaft comprising, an axially extending first crankshaft part and an axially extending second crankshaft part arranged in axial alignment and having adjacent ends, the axially extending crankshaft parts being rotatable on an axis, inter-engaging means integrally formed on said ends of said parts for positioning said crankshaft parts in a definite circumferential relationship, said inter-engaging means comprising a tang formed on one of said parts and a complementary slot for receiving said tang on the other of said parts, a sleeve press fit over said adjacent ends of said axially extending crankshaft parts for forming a torque transmitting driving connection between said parts, said sleeve being rotatable with said crankshaft parts on said axis, bearing means around said sleeve, and a split housing bearing support around said bearing means for supporting said bearing means and for rotatably supporting said crankshaft, said bearing support including an upper semi-cylindrical cap and a lower semi-cylindrical bearing support case removably secured to said cap; and fastening means for circumferentially expanding said bearing support case and comprising a slit formed in said bearing support case, a tapered hole in said case and located in said slit, and a tapered pin engageable in said hole for causing said support case to expand circumferentially.

* * * * *